US006543243B2

(12) United States Patent
Mohrmann et al.

(10) Patent No.: US 6,543,243 B2
(45) Date of Patent: Apr. 8, 2003

(54) HYBRID COMPRESSOR

(75) Inventors: Robert John Mohrmann, Pinckney, MI (US); Brian Robert Kelm, Northville, MI (US); Rance Andrew Stehouwer, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 44 days.

(21) Appl. No.: 09/888,364

(22) Filed: Jun. 21, 2001

(65) Prior Publication Data

US 2002/0194858 A1 Dec. 26, 2002

(51) Int. Cl.[7] .................................................. F25B 49/02
(52) U.S. Cl. ........................ 62/230; 62/228.4; 62/236; 62/510; 62/323.4
(58) Field of Search ........................ 62/175, 133, 236, 62/228.1, 228.4, 228.5, 230, 510, 469, 505, 323.4, 243

(56) References Cited

U.S. PATENT DOCUMENTS

| | | | |
|---|---|---|---|
| 1,953,941 A | * 4/1934 | Anderson ................. 62/510 X |
| 2,246,244 A | 6/1941 | Consley | |
| 2,902,205 A | 9/1959 | Parker | |
| 3,211,365 A | 10/1965 | Phelps | |
| 4,179,248 A | 12/1979 | Shaw ......................... 417/427 |
| 4,411,141 A | 10/1983 | Hara ............................ 62/468 |
| 4,720,980 A | * 1/1988 | Howland .................. 62/236 X |
| 4,738,584 A | 4/1988 | Price ........................... 415/60 |
| 5,056,330 A | * 10/1991 | Isobe et al. .................. 62/236 |
| 5,178,520 A | 1/1993 | Strelow ....................... 417/62 |
| 5,722,257 A | 3/1998 | Ishii et al. .................... 62/505 |
| 5,934,089 A | 8/1999 | Nakagawa et al. .......... 62/133 |
| 6,230,507 B1 | * 5/2001 | Ban et al. .................. 62/228.4 |

* cited by examiner

Primary Examiner—Harry B. Tanner
(74) Attorney, Agent, or Firm—Brinks Hofer Gilson & Lione

(57) ABSTRACT

An air conditioning system includes an engine driven compressor, and an independent electric motor driven compressor in a common housing. A controller adjusts the independent operation of the engine driven compressor and electric motor driven compressor in response to cooling demand input, and operational parameters of the engine and the battery, as well as optionally the electric motor driven compressor output and engine driven compressor output. A method of independently operating an engine driven compressor and electric motor driven compressor is also provided. The air-conditioning system, controller, and method are particularly useful in hybrid vehicles that use smaller displacement internal combustion engines and electric motor drive means.

12 Claims, 2 Drawing Sheets

HYBRID COMPRESSOR

FIELD OF THE INVENTION

This invention relates generally to the field of compressors for use in air conditioning systems, such as automotive air conditioning systems. In particular, this invention relates to a new design for an automotive air conditioning system that utilizes a hybrid mechanically and electrically driven compressor, which has improved efficiency.

DESCRIPTION OF THE RELATED ART

Some designs for air conditioner or refrigeration units for cars, trucks, trains, ships and airplanes permit the units to be powered by an engine when the engine is operative, and by a battery driven motor when the engine is off. To make vehicles more energy efficient, an integrated starter generator (ISG) can shut the engine off when the vehicle is stopped to minimize emissions and improve fuel economy. An electric motor can drive the compressor of the air conditioning system when the engine stops.

An increasing number of hybrid vehicles are being manufactured with a view towards increased fuel efficiency and reduced emissions. One type of hybrid vehicle has an electric motor that generates driving force in combination with an internal combustion engine that typically utilizes fossil fuel. The electric motor can assist in driving the hybrid vehicle. The motor can be powered by batteries that can be charged when the engine is running or by an external charger.

It is desired to use smaller displacement engines in hybrid vehicles, and to also reduce the power demands placed on the engines by accessories, such as power steering pumps and air conditioning compressors.

In many automotive systems, an internal combustion engine is operatively connected to an air conditioner compressor via a belt and pulley mechanism. It is also known in the art for an air conditioner compressor to be provided with an electric motor to drive the compressor when the engine is not running. The drive shaft of the compressor is extended out through the casing and can be operatively connected to the pulley via a one-way clutch, which is engaged when the pulley is driven. The pulley is locked to the compressor shaft when the clutch is engaged so that the engine drives the shaft, but the pulley will idle in relation to the compressor shaft when the engine is not driving the pulley and the compressor shaft is turned by the electric motor.

If continued air conditioning or refrigeration is required while the engine is stopped, the electric motor drives the compressor. When the engine is restarted, the electric motor is stopped, and the clutch engaged again to drive the compressor.

Further information on air conditioning systems and hybrid mechanically/electrically driven compressors can be found in the patent literature, articles, and books, such as but not limited to U.S. Pat. No. 2,246,244, U.S. Pat. No. 2,902,205, U.S. Pat. No. 3,211,365, U.S. Pat. No. 4,179,248, U.S. Pat. No. 4,411,141, U.S. Pat. No. 4,738,584, U.S. Pat. No. 5,178,520, U.S. Pat. No. 5,722,257, and U.S. Pat. No. 5,934,089, all of which are incorporated by reference as if reproduced in full herein.

In a fixed displacement hybrid compressor system, frequent cycling between engine drive and motor drive, as well as the increased inertial requirements from the motor, lead to increased wear on the clutch of the hybrid system versus that of a system that is engine driven only. Since in a fixed displacement compressor the same compressor displacement is present regardless of whether the engine or electric motor is driving the compressor, power use inefficiencies arise. Power use efficiencies may also arise in hybrid variable displacement compressors. Thus, it is desired to have a more efficient hybrid air conditioning system and to better match compressor displacement and air conditioning system capacity to requirements.

BRIEF SUMMARY OF THE INVENTION

In an embodiment, a hybrid compressor is formed of a main compressor driven by an engine-operated pulley and an auxiliary compressor driven by an electric motor. Preferably, the two compressors share a common housing and system connections, such as suction and discharge chambers and manifolds. In a preferred embodiment, the compressors are operable independently of each other, permitting one or both compressors to be activated. If one compressor has a smaller fixed displacement than the other, three levels of displacement and power requirements are achieved, wherein the first compressor may be driven and the second compressor idle, the first compressor may be idle and the second compressor driven, or the compressors may be simultaneously driven. In an alternative embodiment, one or both of the compressors may be a variable displacement compressor, wherein higher efficiencies may be obtained in matching cooling requirements to capacity and displacement for each of the compressors and engine or electric motor operating parameters.

The compressors are generally positive displacement types that use a displacement mechanism, such as a scroll, reciprocating piston, or rotating vane.

In a preferred embodiment, a common housing is provided in which is located both a low displacement compressor scroll that is drivable by a high speed, high efficiency electric motor and a larger displacement compressor scroll that is drivable by an engine.

In an embodiment, a hybrid stacked scroll compressor is provided with a controller for selectively activating (starting) or deactivating (stopping) the engine and/or engaging or disengaging a clutch operatively connecting the engine to a compressor drive shaft. The controller also selectively activates or deactivates the electric motor. Either or both the engine and the electric motor driven compressors are activated in response to the demand for cooling or air conditioning, while accommodating battery and engine operating parameters.

The present invention also includes a method of operating an electric motor driven compressor and an engine driven compressor in response to the demand for cooling or air conditioning, and battery and engine operating parameters.

It is to be understood that both the preceding summary and the detailed description that follows are intended merely to be exemplary and to further explain the invention claimed. The invention may be better understood by reference to the following detailed description read in conjunction with the accompanying drawings.

DETAILED DESCRIPTION OF THE INVENTION

Figure 1:
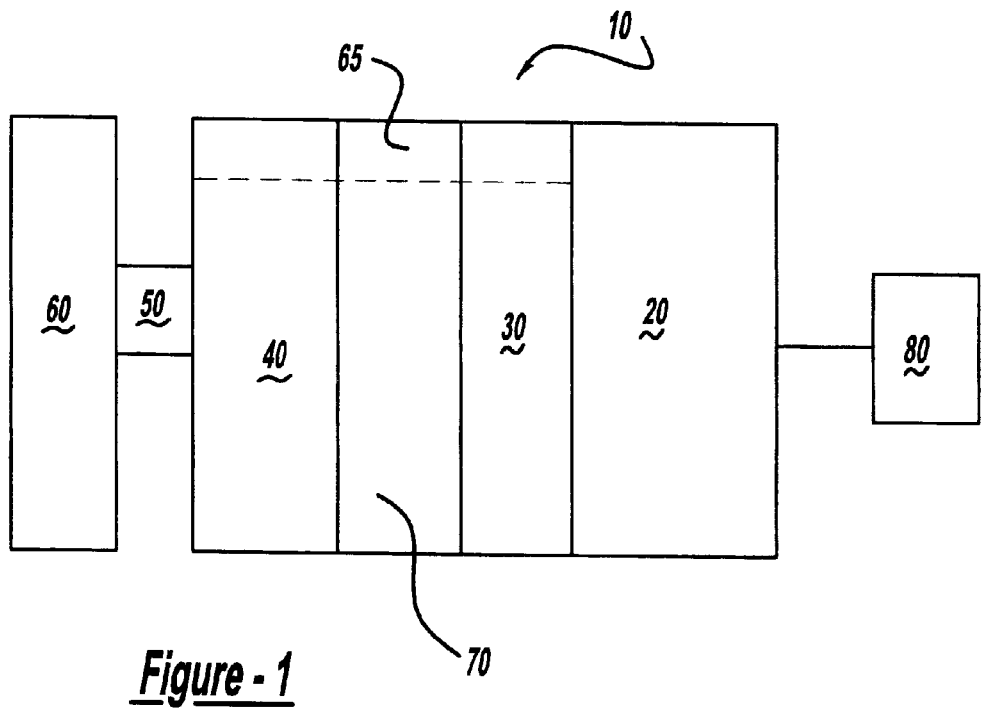
FIG. 1 is a schematic illustration of a hybrid compressor in accordance with the present invention.

An embodiment of the present invention may be better understood with reference to FIG. 1. A common housing or casing 10 contains an electric motor 20, first compressor 30 that can be driven by motor 20, a second compressor 40, a drive shaft 50, and a clutch 60. Compressors 30 and 40 include a displacement mechanism, which is generally a positive displacement type, such as a scroll, reciprocating piston, or rotating vane.

Common housing 10 may be substantially cylindrical in shape, with removable disk shaped end plates at opposite ends. The cylindrical portion may comprise two half cylinders with matched longitudinal connecting flanges to permit connection to each other, and radial flanges at their curved ends for connection to the end plates. Inlet and outlet orifices are provided. Flanges for coupling the compressor apparatus to an engine compartment or engine may also be provided.

Clutch 60 is preferably a one-way clutch that is engaged to turn shaft 50 when the engine is operating and it is desired to activate second compressor 40.

In an alternative embodiment, second compressor 40 may be a variable displacement scroll, and clutch 60 may be dispensed with. Hence, the two compressors can be of different types. In this latter embodiment, whenever the engine is operating, a gear or pulley and belt mechanism turns shaft 50, and the second compressor displacement is minimized except when there is sufficient demand.

The term stacked scroll compressor is preferably used herein to refer to a compressor having two or more independent scrolls which are aligned in an axial fashion in close linear proximity to one another. In a preferred embodiment, both compressors use a scroll displacement mechanism, and both scrolls are aligned on the same axis, thus permitting more ready placement in a common housing, and facilitating the use of shared common fittings. However, it is envisioned that other spatial relationships between the scrolls may be utilized. For example, the scrolls may be aligned so that each is on a different axis that may be parallel and the scrolls may rotate in the same or different planes. A stacked scroll hybrid compressor refers to a compressor system using two or more scroll displacement mechanisms, at least one scroll driven by an engine and at least one other scroll driven by an electric motor.

In the embodiment illustrated in FIG. 1, a common cylindrically shaped housing 10 includes a common suction cavity 65 and a common discharge cavity 70, and also incorporates the electric motor. This embodiment reduces the space required in the engine compartment as well as the total system weight as the hybrid compressor does not require as much material to create a separate housing for the electric motor in addition to that required for the compressor. It also reduces the amount of material required in comparison to that needed to construct separate housings and fittings for separate displacement components. This embodiment provides optimum advantages for hybrid cars, since it enables the compressor system to more readily fit into the smaller engine compartments of hybrid cars, reduces the weight of the hybrid compressor, simplifies installation, and reduces the cost of the compressor and hence the cost of building and operating the vehicle.

Since the engine must only drive a smaller compressor, another advantage to this invention is that there are less input torque requirements from the engine's front end accessory drive (FEAD), reducing parasitic loss on the FEAD due to the compressor.

A controller 80 is operatively connected to an air conditioner demand input, an engine operation sensor and control, a battery charge sensor, and an electric motor operation sensor and control. The controller is provided with a microprocessor, electronic memory for storing programming instructions and transient operating conditions, and operations data inputs for the engine, battery, temperature, and electric motor sensors, and outputs for the engine and electric motor controls. The controller continually receives data from the sensors and the air conditioner demand input, calculates compressor output requirements, compressor capacities, and activates or deactivates the electric motor, the engine, and/or the clutch to drive one or both compressors as needed. Where a variable displacement compressor is used for the engine driven compressor, appropriate programming adjustments are made, wherein the amount of displacement can be adjusted rather than a clutch activation program routine.

Although the embodiment shown in FIG. 1 is directed to a common housing, it is also contemplated that the electric motor may be in a separate housing, or the electric motor and first compressor can be in a separate housing although this may require separate suction and discharge fittings that may be coupled by a manifold with the suction and discharge fittings of the engine driven compressor housing. Although a cylindrical housing is illustrated, the housing may be of varying shapes to accommodate the compressors and the engine compartment. For example, the housing may be in an L-shape, wherein the two compressors are perpendicular to one another.

The compressor displacement mechanism and electric motor can be of conventional construction and formed of materials that are standard in the art. The housing can be of metal and seals can be of polymeric organic materials, although other materials can be used. Conventional engine start and stop mechanisms, air conditioning and engine sensors, equipment and controls may be used.

Figure 2:
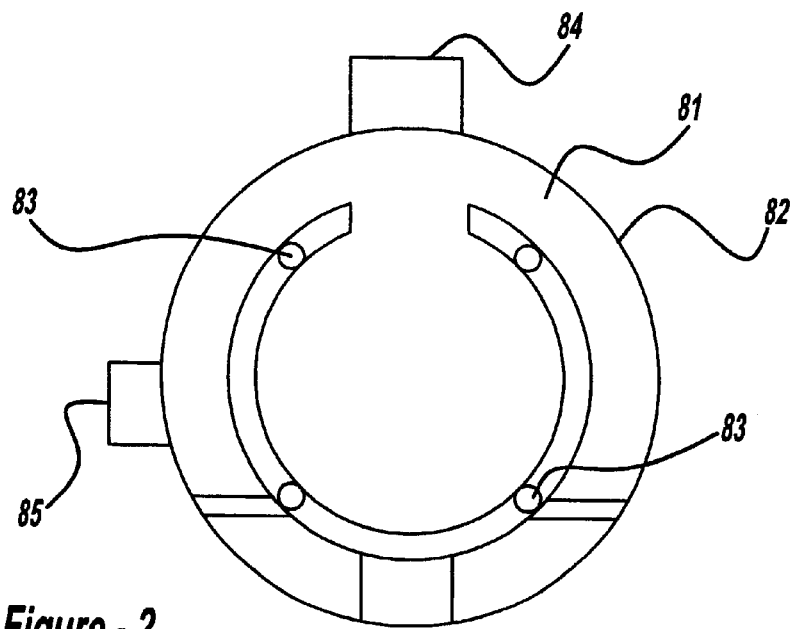
FIG. 2 is an end view of a cylindrical housing containing two independent compressors, aligned end to end.

With reference to FIG. 2, an end view of a cylindrical housing for a hybrid compressor constructed in accordance with the present invention is illustrated. A disk-shaped end plate 81 is connected to an outer cylindrical housing wall 82, the view of which is blocked in FIG. 2 by plate 81. Bolts 83 may extend into the interior of the housing to support the compressor displacement mechanism, such as a fixed scroll. A compressor discharge manifold 84 projects outward from the side of the compressor housing. A compressor inlet 85 also projects from the side of the housing. In a preferred embodiment, the compressor discharge outlet and inlet outlet are located between the first and second compressors within the compressor system housing.

The opposite end plate of the housing provides a central opening for projection of a shaft that can be coupled to a drive source, such as an engine. The opening would also include appropriate seals as is known in the art. Optionally, endplate 81 may also be provided with an opening through which a drive shaft may be inserted.

Figure 3:
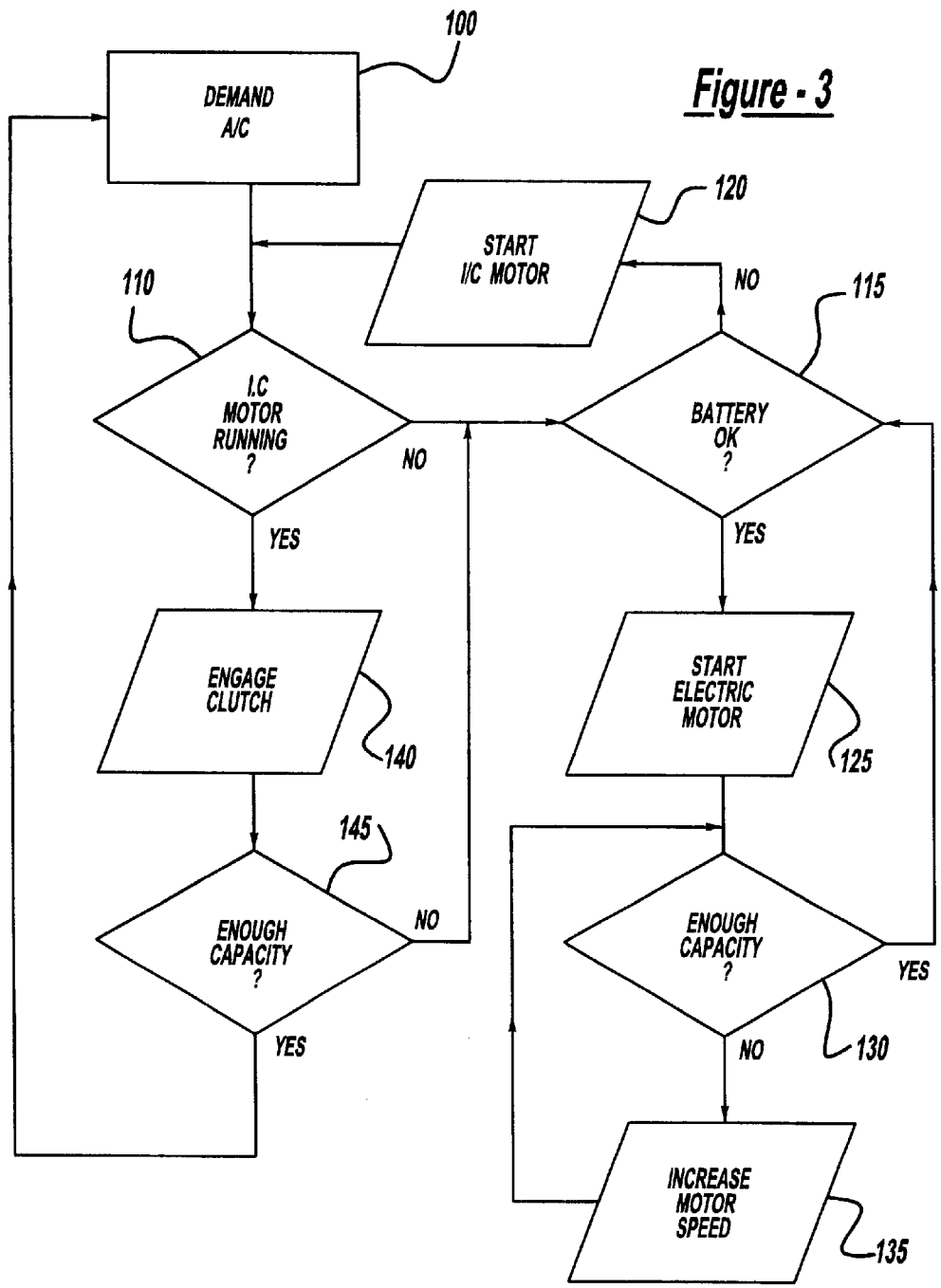
FIG. 3 is a flow chart illustrating a control routine for operating an electric motor driven compressor and an engine driven compressor in response to the demand for cooling or air conditioning, and battery and engine operating parameters.

With reference to FIG. 3, a control routine is illustrated for operating an electric motor driven compressor and an engine driven compressor in response to the demand for cooling or air conditioning, and battery and engine operating parameters. An operations method for controlling an electric motor driven compressor and an engine compressor starts with step 100, in which a demand for cooling or air conditioning is input to a control (e.g., control 80), or conversely terminates when no demand is made for cooling. The routine execution proceeds to step 110, where it is determined whether the engine is running. If no, a logic routine is executed in which the demand for cooling, as determined by the desired temperature and the instant temperature at one or more sensor locations and optionally environmental conditions, can be met by battery stored energy in step 115 and electric motor output capabilities. If battery power or electric motor output capabilities cannot meet the demand, a start motor routine shown by step 120 is executed. If battery storage and electric motor output capabilities are sufficient to meet demand, the electric motor is started via a start routine 125. If cooling demand exceeds engine driven output capabilities, both the start engine routine 120 and start electric motor routine 125 are initiated.

Electric motor driven cooling output capabilities are matched to demand via a control subroutine, shown by capacity determination step 130 and motor speed adjustment step 135.

Engine cooling output capabilities are matched to demand via a control subroutine, shown by clutch engagement step 140 and capacity determination step 145.

There are many variations on the control routine illustrated in FIG. 3, in which a controller adjusts the output of an electric motor driven compressor and an engine driven compressor to meet an output requirement in response to engine and electric motor operating parameters, electric power supply, and environmental conditions of the area to be cooled, e.g., the differential between the desired temperature and the current chamber temperature.

Thus, a new compressor system has been described, comprising a first compressor drivable by a first drive source, and a second compressor drivable by a second drive source, wherein the first and second compressors share a common housing and can be independently operated, operation of the first compressor does not cause operation of the second compressor, and operation of the second compressor does not cause operation of the first compressor. The compressors may each use the same type or different type of displacement mechanism, such as a scroll, swash plate or wobble plate. The system may further comprise an electric motor operatively connected to the first compressor that may share the common housing, a coupling for coupling the second compressor to a second drive source, and a controller having a first input for desired compressor output and outputs for controlling the operation of the first and second compressors in response to the first input. The controller may also have additional inputs for drive source operational parameters. Also disclosed is a new controller, and method of controlling air conditioning or cooling systems, in particular cooling systems in vehicles, preferably hybrid automobiles.

The improved devices and methods of the present invention are useful in all modes of self-propelled vehicles such as but not limited cars, buses, and trucks, and may also be useful in other applications.

While embodiments of a new cooling compressor system and methods of providing cooling have been disclosed as examples herein, there could be a wide range of changes made to these embodiments without departing from the present invention. Thus, it is intended that the foregoing detailed description be regarded as illustrative rather than limiting and that it be understood that it is the following claims, including all equivalents, which are intended to define the scope of the invention.

What is claimed is:

1. A vehicle air conditioner compressor system, comprising:

a first compressor drivable by a first drive source, and a second compressor drivable by a second drive source, wherein said first and second compressors share a common housing and can be independently operated, wherein operation of said first compressor does not cause operation of said second compressor, and operation of said second compressor does not cause operation of said first compressor, and wherein at least one of said compressors is adapted to be driven by a drive source external of said common housing.

2. The compressor system of claim 1, further comprising an electric motor operatively connected to said first compressor, said electric motor being said first drive source for said first compressor.

3. The compressor system of claim 2, wherein said electric motor shares said common housing, wherein said second compressor is adapted to be driven by a second drive source external of said common housing.

4. The compressor system of claim 2, further comprising a coupling for coupling said second compressor to a second drive source.

5. The compressor system of claim 1, further comprising a controller, said controller having a first input for indicating desired compressor output, and outputs for controlling the operation of said first and second compressors in response to said first input.

6. The compressor system of claim 5, further comprising an electric motor operatively connected to said first compressor, and a coupling for coupling said second compressor to a second drive source, wherein said second drive source is an internal combustion engine.

7. The compressor system of claim 6, wherein said electric motor shares said common housing.

8. A controller for a vehicle cooling or air conditioning system compressor apparatus, comprising a first input for temperature, and outputs for controlling independent first and second compressors drivable by independent engine and electric motor drive means, wherein said controller outputs, when operatively connected to first and second compressors, can independently adjust the output of the first and second compressors in response to said first input, wherein said controller outputs can provide control signals to simultaneously operate a first and a second compressor, control signals to operate a first compressor while a second compressor is not operated, or control signals to operate a second compressor while a first compressor is not operated.

9. The controller of claim 8, further comprising a second input for sensing operational parameters of an engine for driving a first compressor and a battery for providing power to an electric motor for driving a second compressor, wherein said controller, when said second input is operatively connected to an engine that drives a first compressor and a battery that provides power to an electric motor for driving a second compressor, independently adjusts the output of the first and second compressor in response to said first input and said second input.

10. A method for improving the efficiency of a vehicle air conditioner compressor system, comprising providing an engine driven compressor and an electric motor driven compressor, wherein said engine driven compressor is not the same as said electric motor driven compressor, wherein said method comprises the step of adjusting the output of said engine driven compressor and electric motor driven compressor in response to a cooling demand, wherein, depending on the cooling demand input, said engine driven compressor is operated simultaneously with said electric motor driven compressor, said engine driven compressor is operated while said electric motor driven compressor is not operated, or said electric motor driven compressor is operated while said engine driven compressor is not operated.

11. The method of claim 10, wherein said engine driven compressor is a variable displacement compressor and is always operating when said engine is operating, wherein said method comprises the step of adjusting the displacement of said variable displacement compressor in response to cooling demand.

12. The method of claim 10, wherein said step of adjusting the output of the engine driven compressor and electric motor driven compressor is dependent upon the operational parameters of an engine operatively connected to said engine driven compressor.

* * * * *